April 22, 1969 A. E. MOORE 3,439,361
SEWAGE COMMINUTING DEVICE
Filed May 11, 1967 Sheet 2 of 2
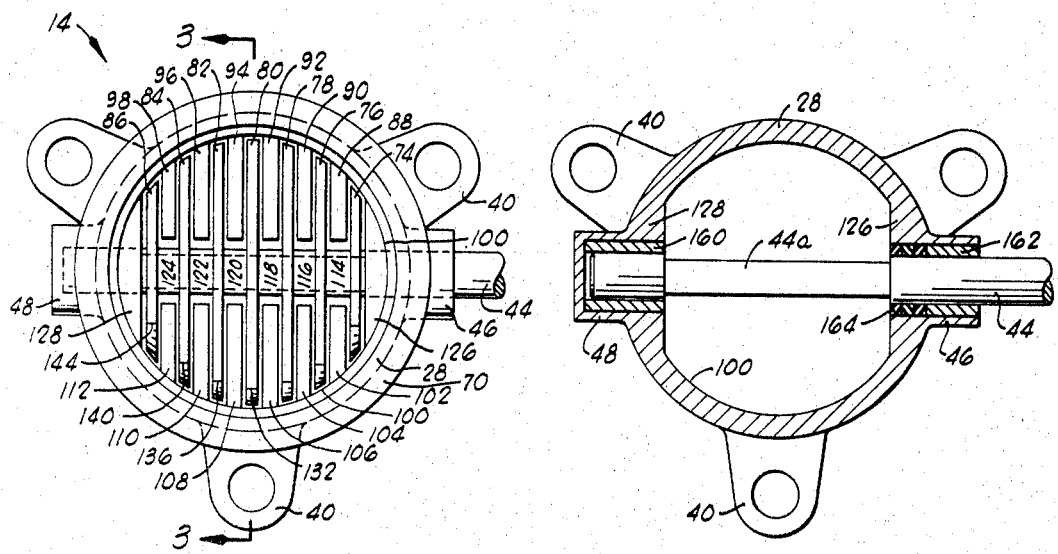
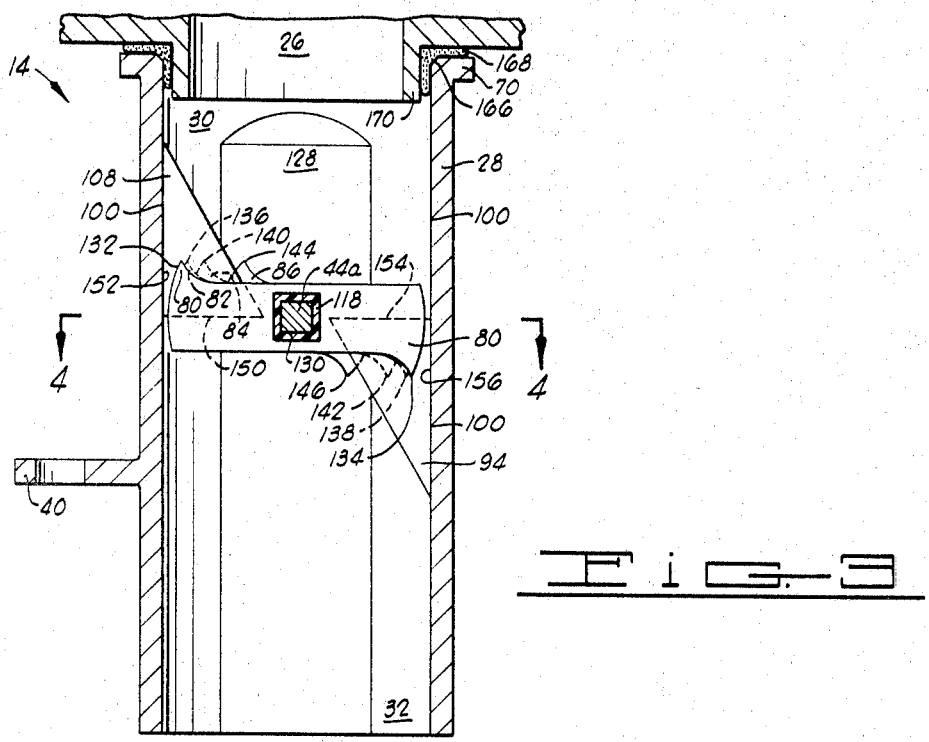
INVENTOR.
ARCHIE E. MOORE
BY
ATTORNEYS

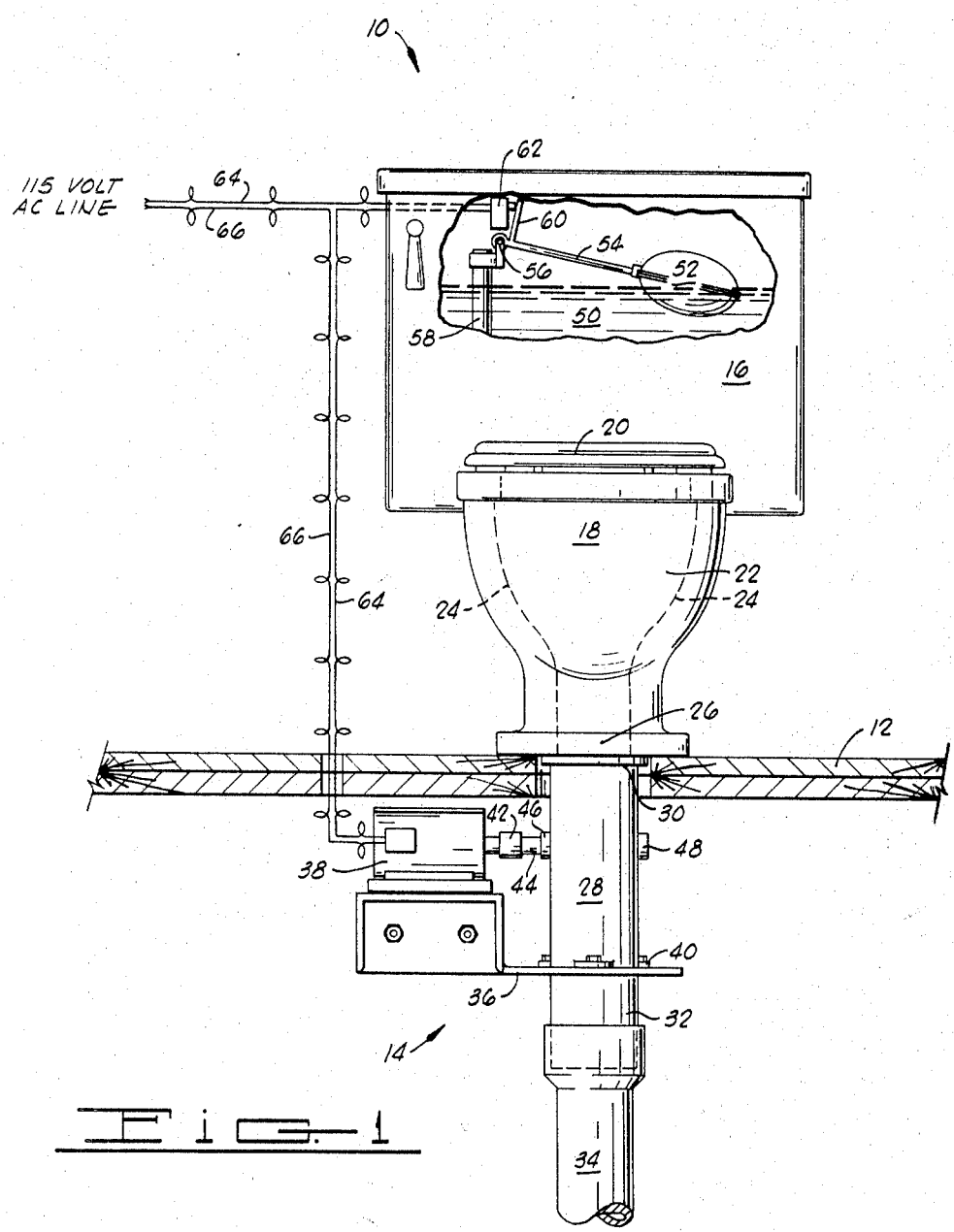

3,439,361
SEWAGE COMMINUTING DEVICE
Archie E. Moore, 1814 S. Hays, Enid, Okla. 73701
Filed May 11, 1967, Ser. No. 637,658
Int. Cl. E03d 1/00, 3/00, 5/00, 11/11
U.S. Cl. 4—10                                    13 Claims

ABSTRACT OF THE DISCLOSURE

An apparatus for combination with conventional toilet facilities which apparatus receives sewage and refuse from the toilet and reduces it to a more fluid material for introduction into sewage disposal lines. The apparatus is a generally cylindrical enclosure which can be connected between a toilet sewage outlet and disposal pipe and which includes a pulverizing mechanism therein which is actuatable in response to flushing of the toilet.

BACKGROUND OF THE INVENTION

Field of the invention

The invention relates generally to sewage disposal apparatus and, more particularly, but not by way of limitation, it relates to improved sewage comminuting apparatus for use in combination with standard types of waste disposal apparatus.

Description of the prior art

Prior known teachings include various types of sewage disposal systems which employ such practices as pulverization or maceration prior to the final disposition of sludge or refuge material. These teachings are usually directed to sewage disposal equipment and apparatus of the portable or temporary type such as is prevalent in connection with boats, house trailers, etc. There is also some prior teaching directed generally toward the pulverization of sewage and refuse material, but, here again, the various structures are highly specialized forms of apparatus for use in specific applications.

Summary of the invention

The present invention contemplates a sewage comminution device which pulverizes sewage and other solid forms of refuse to provide a sewage output of even, fluid consistency. In a more limited aspect, the invention consists of such a comminution device which is adapted for combination with conventional toilet facilities, the device including internal cutting means powered by an electric motor in response to toilet flushing actuation such that the refuse is received into the comminution device, pulverized and expelled for flow through the associated sewage conduits for deposition in septic tanks, cesspools, city refuse lines, or whatever.

Therefore, it is an object of the present invention to finely comminute all articles such as toilet tissue, paper towels, Kleenex, Kotex and other such items which would have a tendency to clog a sewer conduit prior to their being flushed into a sewer line system.

It is also an object of the invention to provide a sewage comminution device of sturdy construction which is easily adapted for connection with existing conventional toilet facilities and sewage disposal lines.

It is a further object of the present invention to provide such a device that is of reliable design and efficient operation and which functions quietly to pulverize all reducible refuse upon each flushing actuation of the toilet facility.

Finally, it is an object of the present invention to provide an improved form of comminuting device which finely divides refuse of compacted, brittle or stranded consistency to a high degree and which provides more fluent refuse for expulsion through the associated sewage lines.

Other objects and advantages of the invention will be evident from the following detailed description when read in conjunction with the accompanying drawings which illustrate the invention.

Brief description of the drawing

FIG. 1 is an elevation of the comminution device in combination with a conventional form of toilet;

FIG. 2 is a top view of the sewage comminution device;

FIG. 3 is a vertical section of the comminution device taken along lines 3—3 of FIG. 2; and FIG. 4 is a sectional view taken along line 4—4 of FIG. 3.

Description of the preferred embodiment

As shown in FIG. 1, a conventional type of toilet is mounted on a portion of floor 12 and a sewage comminuting device 14 is secured therebeneath to receive sewage flow from toilet 10 in fluid-tight relationship. The toilet 10 may be any of various types of toilet accommodation; the exemplary form or toilet 10 comprising a water reservoir 16 and a seat or hopper section 18. The hopper 18 is usually adapted to have a seat and cover arrangement 20 secured by a hinge connection over its open top. An inner bowl portion 22, as outlined by dotted lines 24, is formed into a narrow bottom opening or toilet sewage outlet 26 for explusion of sewage and refuse matter into the associated disposal system.

The sewage comminution device 14 consists of a tubular frame member 28 which is of generally cylindrical or pipe form and is adapted to have an upper inlet or opening 30, adapted for fluid-tight coupling with sewage outlet 26 of toilet hopper 18, and a lower outlet or opening 32 which is adapted to be received within a standard form of sewage disposal conduit 34 in fluid-tight relationship. Well-known types of sealing and cement compounds may be employed in assuring the fluid-tight couplings. A mounting frame such as bracket 36 may be suitably mounted beneath floor 12 for the purpose of supporting the tubular frame member 28 as well as an associated drive motor 38. The tubular frame 28 may be secured by means of ear tabs 40 and suitable fasteners secured to frame 36, and the motor 38 may be similarly fastened utilizing its standard mounting brackets.

The actual comminuting structure is located within the tubular frame 28 and it is powered by means of drive motor 38 which provides rotational output through a conventional form of shaft coupling or linkage 42 to a drive shaft 44 extending into connection with the comminuting structure, to be further described. Frame means 28 is provided with opposed bushing seating formations, a first bushing seating 46 through which shaft 44 passes and a closed end bushing seating 48 wherein the end of shaft 44 is rotatably affixed. Good operation has been obtained when motor 38 is selected to be a one-third horsepower AC motor of commercially available type.

The water reservoir 16 is a conventional form of device and includes a water supply 50 and conventional water-level valve control (not specifically shown) actuated by a float 52 secured on a float arm 54 which is vertically pivotable about a valve control point 56 secured atop a tubular support member 58, all of this being conventional structure. In addition, however, float arm 54 is fitted with a perpendicular extension 60 secured thereon and a micro-switch 62, or other such type of two-pole, normally closed switch, is securely mounted adjacent the switch arm 60 such that switch 62 is held actuated (open) during quiescent periods when the float 52 is at its upper extreme.

A 115 volt AC line input is provided on leads 64 and 66 and an energizing circuit is completed to motor 38 when the toilet is flushed, thereby moving float 52 downward and switch arm 60 away from microswitch 62 to allow current flow through the energizing lead 64.

The comminuting device 14, particularly the cutting implements, are shown in greater detail in FIGS. 2, 3 and 4. Thus, the tubular frame 28 is a cylindrical member and preferably formed of cast steel to include an upper outward flange 70 which forms a mating end for joinder with other combined structure. The shaft 44 is rotatably inserted through opposite sides of frame 28, bushing seatings 46 and 48, to carry a plurality of cutter blades 74, 76, 78, 80, 82, 84, and 86 for rotation therewith in spaced relationship. A first, upper plurality of cutter bars 88, 90, 92, 94, 96 and 98 are disposed in spaced, parallel relationship and each is rigidly secured about one side of an inner side wall 100 of tubular frame 28. Cutter bars 88–98 are placed equi-spaced between each adjacent pair of cutter blades 74–86. Similarly, a second, lower plurality of cutter bars 102, 104, 106, 108, 110 and 112 are secured about the opposite side of inner side wall 100 between adjacent ones of cutter blades 74–86, and each of cutter bars 102–112 is affixed in alignment with a symmetrical counterpart of the group of cutter bars 88–98. Also, the lower cutter bars 102–112 are affixed in opposite orientation from upper cutter bars 88–98, as will be further described.

A plurality of spacers 114, 116, 118, 120, 122, and 124 are placed about the rotational drive shaft between respective adjacent ones of cutter blades 74–86 to provide their proper spacing with respect to the stationary cutter bars 88–98 and 102–112 while assuring sufficient but minimal clearance space between the intersticed cutting components. Opposite side portions of the passage through tubular frame 28 are stopped off by the arcuately seated spacers 126 and 128. Arcuate spacers 126 and 128 may be formed of metal and affixed about drive shaft 44 adjacent inner side wall 100 of tubular frame 28, or, as is probably the easiest construction, the spacers can be formed integral with inner side wall 100 in the initial casting of tubular frame 28.

As shown in FIG. 3, the cutter blades are shaped with the same general width and disposed in parallel as shown by the disposition of cutter blades 80, 82, 84, and 86. Each of the cutter blades, such as blades 80–86, has a similarly oriented square hole 130 through its center through which is received a square central portion 44a of the rotational drive shaft 44. The fiber spacers such as spacer 118 are then slipped over the shaft portion 44a in the manner shown in FIG. 3.

Each side of the respective cutter blades, such as 80–86, (FIG. 3), has a claw-like shape wherein the leading edge is tapered rotationally forward toward its more outward extent. Thus, cutter blade 80 has its rotational leading edges shaped into points 132 and 134, cutter blade 82 has points 136 and 138, cutter blade 84 has points 140 and 142, and cutter blade 86 has points 144 and 146 formed on its respective leading edges. The upper cutter bars 102–112 are each shaped to have a similar right triangular configuration, and as exemplified by cutter bar 108 (FIG. 3), they are disposed with their respective bases 150 horizontal and perpendicularly aligned with shaft 44 and with their respective adjacent sides 152 welded or otherwise securely fastened to inner side wall 100 of tubular frame 28. The oppositely oriented group of lower cutter bars 88–98 are secured in the manner of the right triangular cutter bar 94 (FIG. 3) having its base side 154 secured perpendicular to and in the same plane with the shaft 44 while its adjacent side 156 is affixed to inner sidewall 100.

As shown in FIG. 4, the shaft 44 is rotatably positioned across the tubular frame 28 to position the square central or driving portion 44a in the flow-way or throat of tubular frame 28. As previously stated, tubular frame 28 is initially formed or cast to include the closed-end bushing seating 48 and the collar bushing seating 46 as disposed on opposite sides of the tubular frame 28. A suitable bushing 160, e.g., a brass sleeve type of bushing, is press-fit into the bushing seating 48 and it receives the end of shaft 44 therein rotatable engagement. A similar brass sleeve or bushing 162 is positioned within bearing seating 46 at its outward extreme and a suitable sealing packing such as plural sealing rings 164 are provided about the inner portion.

It has been found advantageous to provide the inner edge of upper flange 70 of tubular frame 28 with a bevel 166. This enables a more secure seal when the comminuting device 14 is secured beneath a toilet sewage outlet 26 as shown in FIG. 3. Thus, a suitable seal or sealing compound 168 may be employed to assure tight connection of a lower flange portion 170 of a toilet sewage outlet 26 downward in upper throat portion 30 of frame 28.

In operation, the device provides a quiet, rugged cutting and pulverizing device which is capable of shredding and slicing various types of bulk substance which may happen to get deposited in the toilet sewage system. Referring to FIG. 1, the comminuting device 14 is driven by an electric motor 38 upon each flushing actuation of the toilet 10. That is, upon flushing of the toilet, the water supply 50 is released to flow downward into toilet hopper 18 and the water control float 52 is allowed to fall with the water level to move the switch arm extension 60 in a clockwise direction. The switch 62 is a normally closed switch which is held actuated by switch arm 60 when in the non-flush attitude such that the clockwise movement of switch arm 60 releases switch 62 to its normal or closed position such that line voltage on leads 64 and 66 is applied to energize motor 38 to drive the comminution device 14.

Referring to FIGS. 2 and 3, the drive shaft 44 is driven in a clockwise direction (FIG. 3) such that first leading edges of cutter blades 74–86 catch the various constituents of sewage flow and carry them downward through the slicing grid comprised of cutter bars 88–98 while, simultaneously, second leading edges of respective cutter blades 74–86 will perform a similar slicing action upward through the grid of similar cutter bars 102–112. The leading edges of each side of cutter blades 74–86 are brought to a point to enhance their ability both to pulverize and to carry the solid components of waste into the cutter bar grids. With the drive shaft 44 rotating at a relatively high rate of speed, the plurality of cutter blades and the oppositely oriented cutter bar grids provide a high degree of comminution such that the flow of material at the outlet end 32 of tubular frame 28 has a very even, fluent consistency.

The comminution device 14 will continue to run under energization of motor 38 until the flushing sequence is completed. That is, after the water flush and valve closure, the water supply 50 is again allowed to refill. It then rises toward its preset level carrying the water level float 52 upward to bear the switch arm 60 in a counter-clockwise direction and, at a pre-adjusted point, the switch arm 60 will actuate the switch 62 to an open position thereby removing AC energization from the drive motor 38.

The foregoing discloses novel improvements in waste and refuse disposal. The comminution device can be installed with any conventional toilet or bathroom facility beneath the flooring in a manner whereby the outward appearance of the installation will remain unchanged. Further, the device provides a very rugged equipment which is capable of quiet, inexpensive operation to enhance both the sanitation of a sewage disposal system as well as the capability of reduced maintenance with longer operational expectancy.

Changes may be made in the combination and arrangement of elements as heretofore set forth in the specification and shown in the drawings; it being understood that changes may be made in the embodiments disclosed

What is claimed is:
1. A sewage comminuting device for use in combination with a toilet which includes a water supply and flush actuator and which provides a sewage outlet, comprising:
  tubular frame means having an inner wall defining a space with one end connected to said toilet sewage outlet and the opposite end providing a comminuted sewage outlet;
  bushing means disposed perpendicular to the direction of flow through said tubular frame means at a point intermediate its ends;
  shaft means rotatably held in said bushing means;
  cutter blade means secured for rotation with said shaft means and being disposed inside of said tubular frame means parallel to the direction of flow;
  cutter bar means disposed in said tubular frame means and being secured therein in shearing relationship to said rotatable cutter blade means;
  motor means connected to provide rotational output to said shaft means; and
  means for periodically energizing said motor means coincident with flushing of said toilet.

2. A sewage comminuting device as set forth in claim 1 wherein said tubular frame means comprises:
  cylindrical conduit means formed of metal having one end adapted for connection with said toilet sewage outlet and having its opposite end adapted for connection to standard sized sewage pipe, said conduit means having brackets formed about an external surface for providing secure connection to said motor means.

3. A sewage comminuting device as set forth in claim 1 wherein said bushing means comprises:
  a first bushing disposed through said tubular frame means for receiving the end of said shaft means in rotatable, sealing engagement;
  a second bushing disposed through said frame means at a point directly opposite said first bushing for receiving the shaft therethrough in rotatable engagement; and
  seal means packed around said shaft adjacent said second bushing to maintain said tubular frame means fluid-tight.

4. A sewage comminuting device as set forth in claim 1 wherein said cutter blade means comprises:
  a plurality of cutter blades positioned in spaced, parallel relationship across said shaft means, each being secured for rotation with said shaft means, and each being formed to have an approximate length equal to the distance across said tubular frame means at its particular location; and
  a plurality of spacer means disposed on said shaft means between each adjacent ones of said cutter blades to maintain their continuous positioning with respect to respective particular locations.

5. A sewage comminuting device as set forth in claim 1 wherein said cutter bar means comprise:
  a first plurality of cutter bars secured about one side of the inner wall of said tubular frame means and being equally spaced in parallel arrangement such that said rotating cutter blades pass through said equi-spaced cutter bars; and
  a second plurality of cutter bars disposed on the opposite inner wall of said tubular frame means and being equi-spaced in parallel arrangement such that said cutter blades pass therethrough.

6. A sewage comminution device as set forth in claim 4 wherein said cutter bar means comprise:
  a first plurality of cutter bars secured about one side of the inner wall of said tubular frame means, said bars being triangular and of symmetrical shape and being equally spaced in parallel arrangement such that said rotating cutter blades pass therethrough; and
  a second plurality of cutter bars disposed on the opposite inner wall of said tubular frame means, said bars being triangular and symmetrically shaped and being equally spaced in parallel arrangement such that said cutter blades pass therethrough.

7. A sewage comminuting device as set forth in claim 6 wherein said cutter bar means are further characterized in that:
  said first plurality of cutter bars are secured on said inner wall within a first part of said tubular frame means relative to said shaft means, and said second plurality of cutter bars are oppositely oriented and secured to said inner wall in the remaining part of said tubular frame means relative to said shaft means.

8. A sewage comminuting device as set forth in claim 1 wherein said means for periodically energizing said motor means, comprises:
  switch means controlling the energization of said motor means; and
  means responsive to said flush actuator to close said switch means to provide energization to said motor means.

9. A sewage comminuting device as set forth in claim 7 wherein said means for periodically energizing said motor means comprises:
  switch means for controlling the energization of said motor means; and
  means responsive to said flush actuator and reduced water supply to energize said switch means.

10. A sewage comminution device in combination with a toilet consisting of a hopper having a sewage outlet and a flushing water inlet, a water supply reservoir connected to said flushing water inlet, a water inlet, a water inlet valve, float control means connected to control said water inlet valve, and a flush actuator, the improvement device comprising:
  tubular frame means having an inner wall defining a space with one end connected to said toilet sewage outlet and with the opposite end providing a comminuted sewage outlet;
  bushing means disposed through opposite sides of said tubular frame means in linear alignment perpendicular to the direction of flow;
  shaft means rotatably held disposed through said bushing means in fluid-tight relationship;
  plural cutter blades disposed in parallel, spaced relationship affixed on said shaft means parallel to the direction of flow inside of said tubular frame means, the leading edges of respective cutter blade means being tapered rotationally forward as said leading edge proceeds outward from said shaft means;
  first and second pluralities of cutter bar means having symmetrical shape disposed parallel to the direction of flow in said tubular frame means, said first plurality of cutter bar means being similarly positioned in spaced, parallel relationship and secured to said tubular frame means inner wall adjacent and above said shaft means, said second plurality of cutter bar means being similarly positioned in spaced, parallel relationship and secured to said tubular frame means inner wall adjacent and below said shaft means;
  motor means securely mounted with respect to said tubular frame means and connected to provide rotational output to said shaft means;
  means responsive to said flush actuator and float control means to actuate said switch means to energize said motor means whenever said water supply level falls below a predetermined amount.

11. A sewage cutting device comprising:
  frame means having an inner wall defining a flow-way with one end for receiving sewage input and the opposite end providing a comminuted sewage outlet;
  bushing means disposed perpendicular to the direction of flow and in alignment through opposite sides of said frame means at a point intermediate the ends; shaft means rotatably held in said bushing means; cutter blade means secured for rotation with said shaft means and being disposed across said flow-way; cutter bar means disposed in said flow-way and being secured to said inner wall of the frame means in shearing relationship to said cutter blade means; and drive means for imparting rotational motion to said shaft means.

12. A sewage cutting device as set forth in claim 11 wherein said cutter blade means comprises:

a plurality of cutter blades affixed in spaced, parallel relationship across said shaft means within said flow-way, each blade being formed to have a length approximately equal to the distance across said flow-way at its particular location, and each blade leading edge being tapered rotationally forward proceeding outward from said shaft affixture; and a plurality of spacer means disposed along said shaft means between each adjacent ones of said cutter blades to maintain their continuous positioning with respect to said particular locations.

13. A sewage cutting device as set forth in claim 12 wherein said cutter bar means comprise:

a first plurality of cutter bars secured about one side of said inner wall adjacent said shaft means, said bars being triangular and of similar shape and being equally spaced in parallel arrangement such that said rotating cutter blades pass between respective adjacent ones of said cutter bars; and a second plurality of cutter bars disposed about the opposite side of said inner wall adjacent said shaft means, said bars being triangular and similar in shape and being equally spaced in parallel arrangement such that said cutter blades pass between respective adjacent cutter bars.

References Cited

UNITED STATES PATENTS

| | | | |
|---|---|---|---|
| 1,871,489 | 8/1932 | Ammon | 241—189 |
| 2,200,061 | 5/1940 | Green | 4—10 |
| 2,435,845 | 2/1948 | Rice | 4—10 |
| 2,651,471 | 9/1953 | Noll | 241—189 |
| 2,658,202 | 11/1953 | Wolman et al. | 4—8 |
| 3,259,917 | 7/1966 | Rascov | 4—10 |

LAVERNE D. GEIGER, *Primary Examiner.*

HENRY K. ARTIS, *Assistant Examiner.*

U.S. Cl. X.R.

241—46, 189